(12) United States Patent
Yoshioka et al.

(10) Patent No.: US 10,334,239 B2
(45) Date of Patent: Jun. 25, 2019

(54) IMAGE PROCESSING APPARATUS, CALIBRATION METHOD, AND CALIBRATION PROGRAM

(71) Applicant: OMRON Corporation, Kyoto-shi, Kyoto (JP)

(72) Inventors: Kazushi Yoshioka, Minamikusatsu (JP); Kengo Ichimura, Otsu (JP); Hiroyuki Hazeyama, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 167 days.

(21) Appl. No.: 15/219,412

(22) Filed: Jul. 26, 2016

(65) Prior Publication Data

US 2017/0039715 A1 Feb. 9, 2017

(30) Foreign Application Priority Data

Aug. 7, 2015 (JP) ................................. 2015-157666

(51) Int. Cl.
*G06T 7/73* (2017.01)
*H04N 17/00* (2006.01)

(52) U.S. Cl.
CPC ............ *H04N 17/002* (2013.01); *G06T 7/75* (2017.01); *G06T 2207/10016* (2013.01); *G06T 2207/30121* (2013.01); *G06T 2207/30141* (2013.01)

(58) Field of Classification Search
None
See application file for complete search history.

(56) References Cited

U.S. PATENT DOCUMENTS

2009/0251699 A1* 10/2009 George ................. H01L 21/681
356/401
2012/0229620 A1* 9/2012 Ikeda ..................... B25J 9/1697
348/94

(Continued)

FOREIGN PATENT DOCUMENTS

CN 1226592 C 11/2005
CN 102598896 A 7/2012
(Continued)

OTHER PUBLICATIONS

Ning Tan, "Calibration of micro and nanorobotic systems: Contribution of influential parameters to the geometric accuracy", HAL archives-ouvertes fr, Dec. 16, 2013, Retrieved from the Internet: URL:https://tel.archives-ouvertes.fr/tel-01025313 [retrieved on Nov. 29, 2016].

(Continued)

*Primary Examiner* — Bernard Krasnic
(74) *Attorney, Agent, or Firm* — Metrolexis Law Group, PLLC

(57) ABSTRACT

A positional calibration is enabled between an imaging device and a stage structure including X and Y stages that move independently of each other. An image processing apparatus performs the positional calibration of a camera coordinate system for an imaging device with a stage coordinate system using a reference position in a first image coordinate space indicating a position of a mark in an image captured when an X-stage is at a reference position, a displaced position in the first image coordinate space indicating a position of the mark in an image captured when the X-stage is at a first displaced position to which the X-stage moves in X-direction from the first reference position, and a virtual position in the first image coordinate space indi- (Continued)

cating a position of the mark in an image calculated using the characteristic value of a Y-stage.

14 Claims, 12 Drawing Sheets

(56) References Cited

U.S. PATENT DOCUMENTS

| | | | |
|---|---|---|---|
| 2012/0236140 A1* | 9/2012 | Hazeyama | B25J 9/1697 |
| | | | 348/94 |
| 2012/0262626 A1* | 10/2012 | Ikeda | H05K 13/0015 |
| | | | 348/373 |
| 2012/0301632 A1 | 11/2012 | Lee | |
| 2014/0015956 A1* | 1/2014 | Fujikawa | G06T 3/4038 |
| | | | 348/86 |
| 2014/0301632 A1* | 10/2014 | Ikeda | G06T 7/004 |
| | | | 382/152 |

FOREIGN PATENT DOCUMENTS

| | | |
|---|---|---|
| CN | 102674072 A | 9/2012 |
| CN | 102674073 A | 9/2012 |
| EP | 2279521 A1 | 2/2011 |
| JP | 2007-017424 A | 1/2007 |
| JP | 2013-208827 A | 10/2013 |

OTHER PUBLICATIONS

Chinese Office Action (CNOA) dated Nov. 21, 2018 in a counterpart Chinese patent application.

* cited by examiner

Fig. 10

$$\begin{pmatrix} x_2 \\ y_2 \end{pmatrix} = \begin{pmatrix} \cos(\alpha) & -\sin(\alpha) \\ \sin(\alpha) & \cos(\alpha) \end{pmatrix} \begin{pmatrix} \beta(x_1 - x_0) \\ \beta(y_1 - y_0) \end{pmatrix} + \begin{pmatrix} x_0 \\ y_0 \end{pmatrix} \quad \cdots \text{Formula 1}$$

$$\begin{pmatrix} x_2 \\ y_2 \end{pmatrix} = \begin{pmatrix} \cos(-\alpha) & -\sin(-\alpha) \\ \sin(-\alpha) & \cos(-\alpha) \end{pmatrix} \begin{pmatrix} \beta(x_1 - x_0) \\ \beta(y_1 - y_0) \end{pmatrix} + \begin{pmatrix} x_0 \\ y_0 \end{pmatrix} \quad \cdots \text{Formula 2}$$

$$\begin{pmatrix} X_0 \\ 0 \end{pmatrix} = \begin{pmatrix} A & B \\ D & E \end{pmatrix} \begin{pmatrix} x_0 \\ y_0 \end{pmatrix} + \begin{pmatrix} C \\ F \end{pmatrix} \quad \cdots \text{Formula 3}$$

$$\begin{pmatrix} X_1 \\ 0 \end{pmatrix} = \begin{pmatrix} A & B \\ D & E \end{pmatrix} \begin{pmatrix} x_1 \\ y_1 \end{pmatrix} + \begin{pmatrix} C \\ F \end{pmatrix} \quad \cdots \text{Formula 4}$$

$$\begin{pmatrix} X_0 \\ Y_2 \end{pmatrix} = \begin{pmatrix} A & B \\ D & E \end{pmatrix} \begin{pmatrix} x_2 \\ y_2 \end{pmatrix} + \begin{pmatrix} C \\ F \end{pmatrix} \quad \cdots \text{Formula 5}$$

$$Y_2 = X_1 - X_0 \quad \cdots \text{Formula 6}$$

Fig. 11A

Stage setting
- Stage type: X(Y) Stage
- Rotation characteristic: ⦿ Positive  ○ Negative X(Y) stage individual setting
- Moving axis: ⦿ X-axis  ○ Y-axis
- Coordinate system: ⦿ Left-handed  ○ Right-handed
- Y-axis relative angle (to X-axis): 90.000000
- Y-axis relative magnification (to X-axis): 1.000000
- X-axis movable range: -99999.9999 – 9999.9999

Fig. 11B

Stage setting
- Stage type: Xθ (Yθ) stage
- Rotation characteristic: ⦿ Positive  ○ Negative X(Y) stage individual setting
- Moving axis: ⦿ X-axis  ○ Y-axis
- Coordinate system: ⦿ Left-handed  ○ Right-handed
- Y-axis relative angle (to X-axis): 90.000000
- Y-axis relative magnification (to X-axis): 1.000000
- X-axis movable range: -99999.9999 – 9999.9999
- θ-axis movable range: -180.0000 – 180.0000
- θ-axis type: ⦿ Direct drive  ○ Linear drive
- Distance from rotation center to linear axis: 0.000000
- Camera moving axis: ☐ X-axis  ☐ Y-axis

IMAGE PROCESSING APPARATUS, CALIBRATION METHOD, AND CALIBRATION PROGRAM

FIELD

The present invention relates to a positioning device for positioning an object using image processing, a calibration method, and a calibration program.

BACKGROUND

Various automation techniques have been developed at manufacturing sites. One such automation technique known in the art is positioning of an object using an image processing apparatus.

As one such technique, Patent Literature 1 describes a positional alignment system for aligning an object placed on an XYθ-stage that can translate and rotate, while calculating the positions of reference marks on the object using images of the reference marks captured with cameras.

This positional alignment system performs calibrations before the positional alignment. The calibration process includes measuring the relationship between displacements in XYθ directions and the corresponding displacements in images captured with cameras installed to face the XYθ-stage, determining the relationship between the movement directions of the XYθ-stage and the resultant displacements and the directions and the displacements in the images captured with the cameras to optimize the movement of the XYθ-stage while checking the movement of the XYθ-stage using the cameras, and adjusting the alignment conditions.

Patent Literature 2 describes a technique for bonding a film with various functions onto the surface of a display panel.

CITATION LIST

Patent Literature

Patent Literature 1: Japanese Unexamined Patent Application Publication No. 2007-17424
Patent Literature 2: Japanese Unexamined Patent Application Publication No. 2013-208827

SUMMARY

When two objects are to be aligned, placing the objects on separate 3-axis XYθ-stages increases the number of axes (to six axes in total), and increases the cost. To avoid this, for example, one object may be placed on an Xθ-stage, and the other object may be placed on a Y-stage. The Xθ-stage and the Y-stage are separate from each other. In this case, the calibration technique described in Patent Literature 1 cannot be used.

One or more aspects of the present invention are directed to positional calibrations between an imaging device and a stage structure including separate X and Y stages.

In response to the above issue, one aspect of the present invention provides an image processing apparatus including a processing unit that performs a positional calibration between a stage coordinate system for a stage structure and a camera coordinate system for a first imaging device. The stage structure includes a first stage that moves in a first direction and a second stage that moves in a second direction independently of the first stage. The first imaging device captures an image of a first mark on the first stage or an image of a first mark on an object placed on the first stage. The image processing apparatus includes a memory that stores a mechanical characteristic value of the stage structure and a positional calibration parameter, and the processing unit that calculates the positional calibration parameter using a position of the first mark in an image captured by the first imaging device and the characteristic value. The processing unit obtains a reference position in a first image coordinate space indicating a position of the first mark in an image captured by the first imaging device when the first stage is at a first reference position, obtains a displaced position in the first image coordinate space indicating a position of the first mark in an image captured by the first imaging device when the first stage is at a first displaced position to which the first stage moves in the first direction from the first reference position, calculates a virtual position in the first image coordinate space indicating a position of the first mark to be virtually captured at a first virtual position in the stage coordinate system using the characteristic value of the second stage in the memory when the first mark is assumed to move to the first virtual position, calculates a first positional calibration parameter using the first reference position, the first displaced position, the first virtual position, the reference position in the first image coordinate space, the displaced position in the first image coordinate space, and the virtual position in the first image coordinate space, and stores the first positional calibration parameter in the memory.

The first reference position may be any position of the mark in the image captured with the first imaging device. The first stage may be at the origin.

Another aspect of the present invention provides a position calibration method implemented by a processing unit included in an image processing apparatus to perform a positional calibration between a stage coordinate system for a stage structure and a camera coordinate system for a first imaging device. The stage structure includes a first stage that moves in a first direction and a second stage that moves in a second direction independently of the first stage. The first imaging device captures an image of a first mark on the first stage or an image of a first mark on an object placed on the first stage. The method implemented by the processing unit includes the steps of obtaining a reference position in a first image coordinate space indicating a position of the first mark in an image captured by the first imaging device when the first stage is at a first reference position, obtaining a displaced position in the first image coordinate space indicating a position of the first mark in an image captured by the first imaging device when the first stage is at a first displaced position to which the first stage moves in the first direction from the first reference position, calculating a virtual position in the first image coordinate space indicating a position of the first mark in an image calculated using a characteristic value of the second stage when the first mark is assumed to move to a first virtual position, and calculating a first positional calibration parameter using the first reference position, the first displaced position, the first virtual position, the reference position in the first image coordinate space, the displaced position in the first image coordinate space, and the virtual position in the first image coordinate space.

Another aspect of the present invention provides an industrial device including a first stage that moves in a first direction, a second stage that moves in a second direction independently of the first stage, a motion controller that controls an operation of the first stage and an operation of the second stage, a first imaging device that captures an image of a mark on the first stage or an image of a mark on an object placed on the first stage, and an image processing apparatus that processes the image. The image processing apparatus performs a positional calibration between a stage coordinate system for the first stage and the second stage and a camera coordinate system for the first imaging device using a reference position in a first image coordinate space indicating a position of the mark in an image captured when the first stage is at a first reference position, a displaced position in the first image coordinate space indicating a position of the mark in an image captured when the first stage is at a first displaced position to which the first stage moves in the first direction from the first reference position, and a virtual position in the first image coordinate space indicating a position of the mark in an image calculated using the characteristic value of the second stage when the mark is assumed to move to a first virtual position, and outputs coordinates in the stage coordinate system resulting from the positional calibration to the motion controller.

The above structure can calculate the first virtual position in the second direction, and can virtually calculate the virtual position in the first image coordinate space. This enables calibrations in the stage structure including the separate first and second stages in which the changing coordinates cannot be read within the field of view of the imaging device when both the first stage and the second stage are moved.

The first stage and the second stage typically have an X-axis in the first direction and a Y-axis in the second direction, which form 90 degrees between them. The relative angle between these directions may not be 90 degrees. The first stage and the second stage may be in the same plane, or may be at skewed positions. For the first and the second stages at the skewed positions, the relative angle between the first direction and the second direction is an angle formed between these directions when the axis in the second direction intersects with the axis in the first direction after the axis in the second direction translates along the optical axis of the imaging device.

The imaging device may typically be a charge-coupled device (CCD) camera or a complementary metal oxide semiconductor (CMOS) camera.

The mark may be in any form whose position can be determined in its image captured with the imaging device. The mark is typically a cross mark, but may be any other mark. A corner of the stage or a corner of the object may be used as the mark.

To "place" herein refers to placing an object in a manner movable together with the stage, and typically refers to placing an object on the stage. When the stage faces downward, placing an object includes placing an object in a manner being attracted on the stage. When the stage faces downward, the imaging device is installed to face upward.

In the image processing apparatus and the position calibration method according to the above aspects of the present invention, the characteristic value includes at least one of a relative angle of the second direction relative to the first direction or a relative magnification of a displacement of the second stage relative to the first stage. The characteristic value may include a right-handed system value or a left-handed system value of the first stage and the second stage. The characteristic value refers to a value indicating a mechanical characteristic of the stage.

In the above structure, the first virtual position and the virtual position in the first image coordinate space can be accurately determined based on the positional relationship between the first stage and the second stage as well as their displacements.

In the image processing apparatus according to the above aspect of the present invention, the processing unit calculates a corrected position in an image coordinate space indicating a position to which the reference position in the first image coordinate space moves in a direction of the displaced position in the first image coordinate space by a distance between the displaced position in the first image coordinate space and the reference position in the first image coordinate space multiplied by the relative magnification, and calculates the virtual position in the first image coordinate space indicating a position to which the corrected position in the image coordinate space rotates by the relative angle about the reference position in the first image coordinate space.

The image processing apparatus according to the aspect of the present invention further includes an input unit that receives input information. The input unit receives the characteristic value from a user. The positional calibration method according to the aspect of the present invention further includes receiving at least one of the relative angle or the relative magnification from the user. Although the input unit is typically a keyboard or a mouse, the input unit may be a personal computer connected to the image processing apparatus or a tablet computer wirelessly connected to the image processing apparatus.

The above structure can respond to design errors between the stages.

The image processing apparatus according to the aspect of the present invention further includes a second imaging device that captures an image of a second mark on the second stage or an image of a second mark on an object placed on the second stage. The processing unit obtains a reference position in a second image coordinate space indicating a position of the second mark in an image captured by the second imaging device when the second stage is at a second reference position, obtains a displaced position in the second image coordinate space indicating a position of the second mark in an image captured by the second imaging device when the second stage is at a second displaced position to which the second stage moves in the second direction from the second reference position, calculates a virtual position in the second image coordinate space indicating a position of the second mark in an image calculated using the characteristic value of the first stage in the memory when the second mark is assumed to move to a second virtual position, calculates a second positional calibration parameter using the second reference position, the second displaced position, the second virtual position, the reference position in the second image coordinate space, the displaced position in the second image coordinate space, and the virtual position in the second image coordinate space, and stores the second positional calibration parameter in the memory.

The image processing apparatus according to the aspect of the present invention further includes an output unit that outputs a value. The processing unit calculates a position of the first mark in the stage coordinate system using the position of the first mark in the image captured by the first imaging device and the first positional calibration parameter, calculates a position of the second mark in the stage coordinate system using the position of the second mark in the image captured by the second imaging device and the second positional calibration parameter, and calculates a difference between the position of the first mark and the position of the second mark in the stage coordinate system. The output unit outputs the difference.

The image processing apparatus according to the aspect of the present invention further includes an output unit that outputs a value. The processing unit calculates a position of the first mark in the stage coordinate system using the position of the first mark in the image captured by the first imaging device and the first positional calibration parameter, and calculates a position of the second mark in the stage coordinate system using the position of the second mark in the image captured by the second imaging device and the second positional calibration parameter. The output unit outputs the position of the first mark and the position of the second mark.

The image processing apparatus according to the aspect of the present invention further includes a third stage movable in conjunction with the first stage and rotatable. The processing unit obtains a reference position in a third image coordinate space indicating a position of a mark on the first stage, a mark on an object placed on the first stage, a mark on the third stage, or a mark on an object placed on the third stage in an image captured by the first imaging device when the third stage is at a third reference position, obtains a displaced position in the third image coordinate space indicating a position of the mark in an image captured when the third stage rotates from the third reference position by a predetermined angle, calculates a position of a rotation center of the third stage using the reference position in the third image coordinate space, the displaced position in the third image coordinate space, and the predetermined angle, and stores the position of the rotation center in the memory.

The rotatable third stage is typically mounted above the first stage, or more specifically, mounted adjacent to the camera. In this case, the mark on the third stage or the mark on the object placed on the third stage is used for the calibration. The third stage may be arranged under the first stage. In other words, the rotation of the third stage causes the rotation of the entire first stage. In this case, the mark on the first stage or the mark on the object placed on the first stage is used for the calibration. The rotation center is determined at a predetermined position of the first stage, and the rotation center is used as the origin of the stage coordinate system.

In the image processing apparatus according to the aspect of the present invention, the processing unit further includes an output unit that outputs a value. The processing unit calculates a rotational angle of the third stage to move the mark from the position of the mark in the image captured by the first imaging device to a predetermined target position. The output unit outputs the rotational angle.

The position calibration method according to the aspect of the present invention includes performing a first positional calibration by calculating an affine transformation parameter using the first reference position, the first displaced position, the first virtual position, the reference position in the first image coordinate space, the displaced position in the first image coordinate space, and the virtual position in the first image coordinate space.

The position calibration method according to the aspect of the present invention includes switching to a second positional calibration with a second imaging device that captures an image of a mark on the second stage or an image of a mark on an object placed on the second stage, obtaining a reference position in a second image coordinate space indicating a position of the mark in an image captured when the second stage is at a second reference position, obtaining a displaced position in the second image coordinate space indicating a position of the mark in an image captured when the second stage is at a second displaced position to which the second stage moves in the second direction from the second reference position, and calculating a virtual position in the second image coordinate space indicating a position of the mark in an image calculated using the characteristic value of the first stage when the mark is assumed to move to a second virtual position, and calculating a second positional calibration parameter using the second reference position, the second displaced position, the second virtual position, the reference position in the second image coordinate space, the displaced position in the second image coordinate space, and the virtual position in the second image coordinate space.

The above structure allows positional calibrations to be performed in the same manner as when the second stage is set as the virtual axis when the virtual axis is switched from the first stage to the second stage.

The position calibration method according to the aspect of the present invention includes switching to a third positional calibration between a stage coordinate system for a stage structure including a third stage movable in conjunction with the first stage and rotatable and the camera coordinate system for the first imaging device, capturing an image of a mark on the first stage, an image of a mark on an object placed on the first stage, an image of a mark on the third stage, or an image of a mark on an object placed on the third stage using the first imaging device when the third stage is at a third reference position, and obtaining a reference position in a third image coordinate space indicating a position of the mark in the image, obtaining a displaced position in the third image coordinate space indicating a position of the mark in an image captured when the third stage rotates from the third reference position by a predetermined angle, and performing a third positional calibration of calculating a rotation center of the third stage using the reference position in the third image coordinate space, the displaced position in the third image coordinate space, and the predetermined angle.

The above structure allows the alignment combining the movement of the first stage and the rotational movement of the third stage.

The image processing apparatus according to the above aspect of the present invention may be a computer. In this case, a program executed by the computer to function as each component of the image processing apparatus, and a computer-readable storage medium storing the program fall within the scope of the invention.

Advantageous Effects

One or more embodiments of the present invention enable positional calibrations between an imaging device and a stage structure including X and Y stages that move independently of each other.

BRIEF DESCRIPTION OF THE DRAWINGS

FIG. 10 is a list of affine transformation matrices.

FIGS. 11A and 11B are diagrams each showing a user interface (UI).

DETAILED DESCRIPTION

Figure 1:
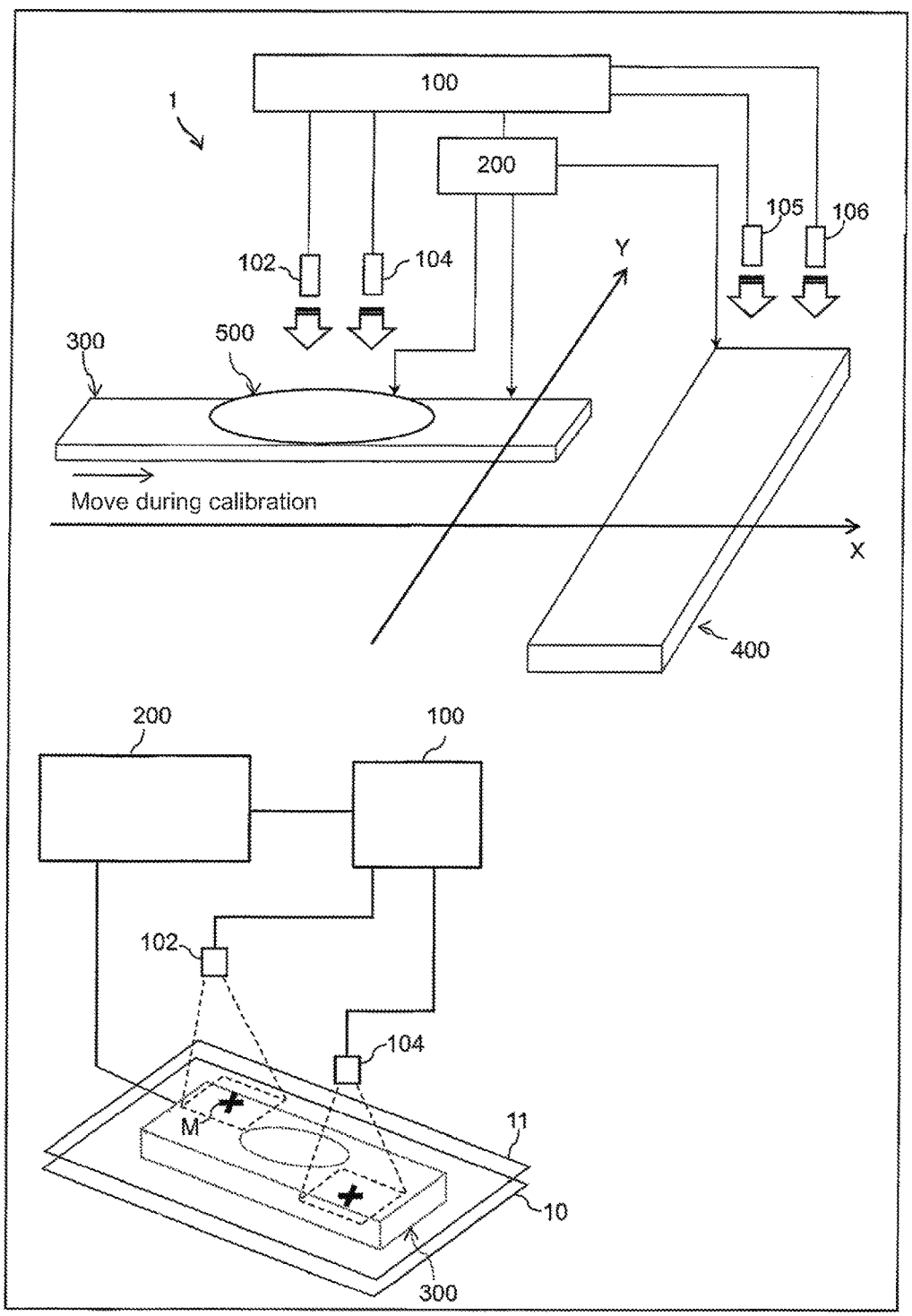
FIG. 1 is a diagram showing a positioning system according to one embodiment of the present invention.

Embodiments of the present invention will now be described with reference to the drawings. The same components or corresponding components are given the same reference numerals and have the same names and functions, and will not be described in detail redundantly.

FIG. 1 is a diagram showing a positioning system according to one embodiment of the present invention. The positioning system (industrial device) is used in manufacturing processes for industrial products, and places (aligns) an object (hereafter, a workpiece) at an intended position in a production line without deviation using image processing. The positioning system according to the present embodiment is used in a production line for liquid crystal panels and controls positioning of a workpiece when a film is bonded onto the workpiece, which is a glass substrate. The positioning system may also be used in mounting components onto circuit boards or assembling components together.

As shown in FIG. 1, the positioning system 1 includes an image processing apparatus 100, one or more first and second cameras 102 and 104 (each corresponding to a first imaging device), third and fourth cameras 105 and 106 (each corresponding to a second imaging device), a motion controller 200, and stages (first to third stages) 300, 400, and 500. The image processing apparatus 100 obtains image data captured with the first and second cameras 102 and 104, and determines the position of the workpiece using the image data. More specifically, the workpiece 10 has distinct positioning marks M at predetermined positions. The image processing apparatus 100 determines the position of the workpiece 10 based on the positions of the positioning marks M included in the obtained image data. A workpiece may have no positioning mark. For a workpiece without a positioning mark, the image processing apparatus 100 detects a corner of the workpiece to determine the position of the workpiece.

The motion controller 200 actuates a servo motor driver (not shown) in accordance with an instruction from the image processing apparatus 100 to move the stages 300, 400, and 500 and to position the workpiece 10. More specifically, the motion controller 200 compares positions determined based on the positions of the positioning marks M on the workpiece 10 with target positions, and then moves the stages 300, 400, and 500 to eliminate the differences between these positions. To bond a film onto a glass substrate, which is the workpiece 10, in a liquid crystal panel production line, the motion controller 200 moves the glass substrate by using the positioning marks M printed on the film as target positions.

The stages 300 and 500 are movable to positions at which the film can be bonded onto the glass substrate, which is the workpiece 10. More specifically, the stages 300 and 500 allow displacements of the workpiece 10 to one side in the horizontal direction, as well as in the rotational direction. More specifically, the stage 300 in the present embodiment includes an X-stage 300 movable in X-direction, and a θ-stage 500 rotatable about a predetermined rotational axis mounted on the X-stage 300. Hereafter, the coordinate system for the stage (stage coordinate system) has its origin at the center of rotation of the θ-stage 500, which is the midpoint (predetermined position) in the movable range of the X-stage 300. The coordinate system has an X-axis in X-direction from the origin, and a Y-axis along a Y-stage 400 movable in Y-direction. In some embodiments, the origin of the stage coordinate system may be an end of the X-stage 300 or an intersection between the X-stage 300 and the Y-stage 400.

When a film (workpiece 11) is bonded onto a glass substrate (workpiece 10), the Xθ-stages 300 and 500 in the present embodiment move to correct misalignments of the glass substrate on the Xθ-stage in X-direction and the rotational direction, and the Y-stage 400, which is independent of the Xθ-stages 300 and 500, move to correct misalignments of the film on the Y-stage 400 in Y-direction. Through these two corrections in combination, the glass substrate and the film are aligned with each other. Bonding the film onto the glass substrate is a mere example, and thus mechanisms for holding or for attracting the glass substrate or the film on the stages or placing the glass substrate or the film on the stages are not shown.

Figure 2:
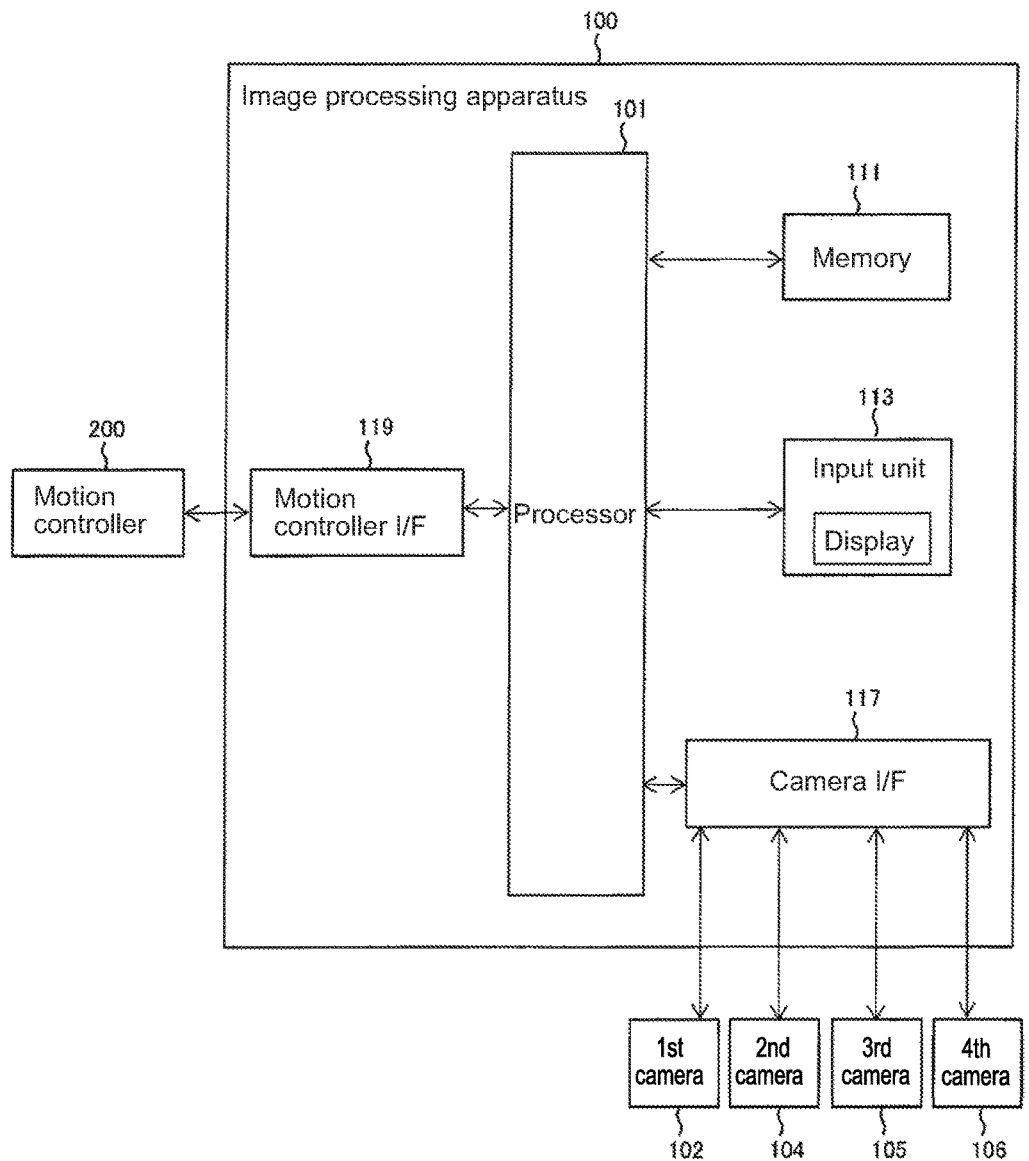
FIG. 2 is a block diagram showing the hardware configuration of an image processing apparatus in one embodiment.

FIG. 2 is a block diagram showing the hardware configuration of an image processing apparatus in one embodiment. As shown in FIG. 2, the image processing apparatus 100 includes a processing unit (processor) 101, a memory 111 for storing data or providing a work area for the processing unit, an operational unit (including an input unit and a display) 113, a camera I/F 117, and a motion controller I/F 119. The processing unit 101 is connected to these components and controls the entire image processing apparatus 100.

The camera I/F 117 receives image data generated by capturing images of the workpiece 10 with the first and second cameras 102 and 104 and the third and fourth cameras 105 and 106, which are installed to face the Xθ-stages 300 and 500. The camera I/F 117 includes a buffer (not shown) for temporarily storing image data from the first and second cameras 102 and 104 and the third and fourth cameras 105 and 106.

The operational unit 113 includes a plurality of keys. The operational unit 113 receives data input by a user operation corresponding to the keys, such as instructions, characters, and numerals. The operational unit 113 includes a display 114, which may be a liquid crystal display (LCD) or an organic electroluminescent display (organic ELD). The display 114 displays instruction menus for the user and information about the obtained image data. The display 114 and the operational unit 113 may form an operation panel.

The motion controller I/F 119 is connected to the motion controller 200. The processing unit 101 transmits and receives data to and from the motion controller 200 through the motion controller I/F 119.

Figure 3:
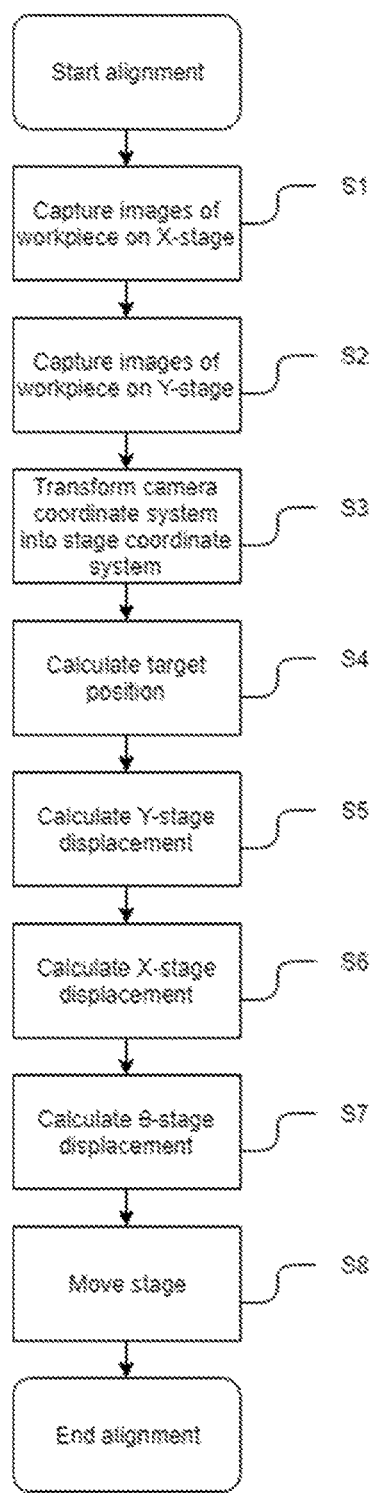
FIG. 3 is a flowchart showing an alignment process.

An alignment process performed after a calibration process (described later) will now be described. FIG. 3 is a flowchart showing the alignment process in one example. The steps shown in FIG. 3 are processes basically performed by the image processing apparatus 100 and the motion controller 200 in cooperation with each other.

In step S1 (capturing images of workpiece on X-stage), the image processing apparatus 100 detects a first mark and a second mark on the workpiece 10 using the first and second cameras 102 and 104, and then calculates a camera coordinate system for each camera.

In step S2 (capturing images of workpiece on Y-stage), the image processing apparatus 100 detects a third mark and a fourth mark on the workpiece 11 using the third and fourth cameras 105 and 106, and then calculates a camera coordinate system for each camera.

In step S3 (transforming camera coordinate system into stage coordinate system), the positions of the first to fourth marks in the stage coordinate system are calculated from the coordinate positions of the first to fourth marks in the images using calibration parameters for each camera.

In step S4 (target position calculation), the point ($X_t$, 0) is used as a target position when the point ($X_t$, $Y_t$) is the midpoint point between the third and fourth marks (hereafter the central point of the workpiece 11) in the stage coordinate system.

In step S5 (Y-stage displacement calculation), a displacement $Y_t$ is calculated for the Y-stage to align the central point of the workpiece 11 with the target position.

In step S6 (X-stage displacement calculation), a displacement $X_t$ is calculated for the X-stage to align the central point of the workpiece 10 with the target position when the central point of the workpiece 10 is the midpoint between the first and second marks in the stage coordinate system.

In step S7 (θ-stage displacement calculation), a rotational displacement et is calculated using deviations of the target marks of the workpieces 10 and 11 when the central points of the workpieces 10 and 11 are aligned with each other.

In step S8 (stage movement), the image processing apparatus 100 outputs the displacements calculated in steps S5 to S7 to the motion controller 200. The motion controller 200 moves the stages 300, 400, and 500 in accordance with the displacements, and ends the alignment process.

To bond the workpieces 10 and 11 together, a mechanism movable in Z-direction (not shown) is used to complete the bonding process after the alignment process.

Although the processing in steps S1 to S8 is performed by the image processing apparatus 100 in the above embodiment, the image processing apparatus 100 may output the stage coordinates indicating the positions of the first to fourth marks obtained in step S3 to the motion controller 200, and the processing in steps S4 to S8 may be performed by the motion controller 200.

The image processing apparatus 100 may output a difference (vector) between the marks captured with the first cameras 102 and 104 and the marks captured with the second cameras 105 and 106 in the stage coordinate system to the motion controller 200. Such output allows high-speed calculation in the motion controller 200 in the alignment process for aligning the mark captured with the first camera 102 with the mark captured with the second camera 105, and aligning the mark captured with the first camera 104 with the mark captured with the second camera 106.

The image processing apparatus 100 may also output the coordinates of the marks captured with the first cameras 102 and 104 in the stage coordinate system and the coordinates of the marks captured with the second cameras 105 and 106 in the stage coordinate system. In this case, the motion controller 200 calculates the positions for the alignment.

The calibration process according to one embodiment of the present invention performed before the alignment process described with reference to FIG. 3 will now be described. The calibration process includes determining the relationship between positional information obtained from the first and second cameras 102 and 104 capturing images of the workpiece 10, and positional information indicating the actual position of the workpiece 10.

As shown in FIG. 1, when the first and second cameras 102 and 104 each capture an image of the corresponding positioning mark M on the workpiece 10, the camera coordinate system used by the first and second cameras 102 and 104 does not match the actual stage coordinate system. These coordinate systems need matching through calibrations. More specifically, the workpiece 10 with the positioning marks M is moved, and the resultant displacements in the camera coordinate system are compared with the resultant displacements in the stage coordinate system to calculate calibration parameters (described later). The calibration process is performed for each camera, which thus obtains calibration parameters specific to each camera.

Figure 6:
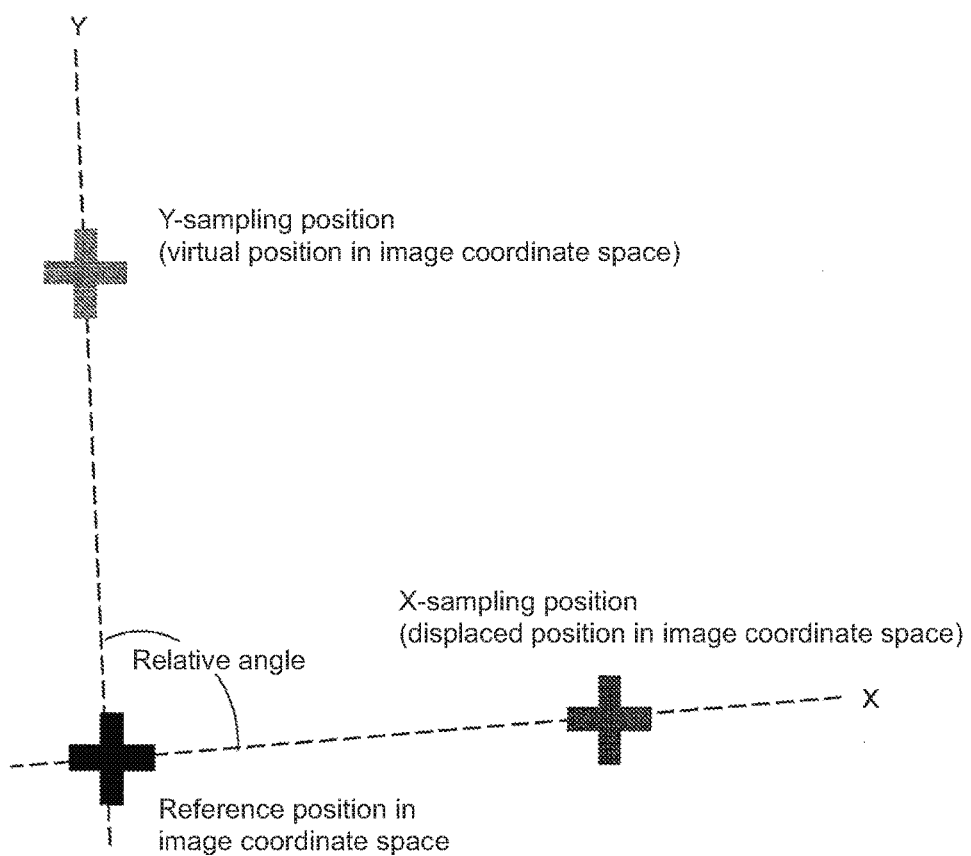
FIG. 6 is a diagram describing a calibration process according to one embodiment of the present invention.

FIG. 6 is a diagram describing the calibration process according to one embodiment of the present invention. FIG. 6 schematically shows an image of a cross mark M on the workpiece 10 captured with each of the cameras 102 and 104. Although each of the cameras 102 and 104 can capture a plurality of marks M in its field of view, the calibration process uses a specific one of the marks M. The virtual position in the image coordinate space is shown in the figure for ease of understanding. The calibration process can be performed without the virtual position in the image coordinate space shown in the image captured with the camera.

Figure 7:
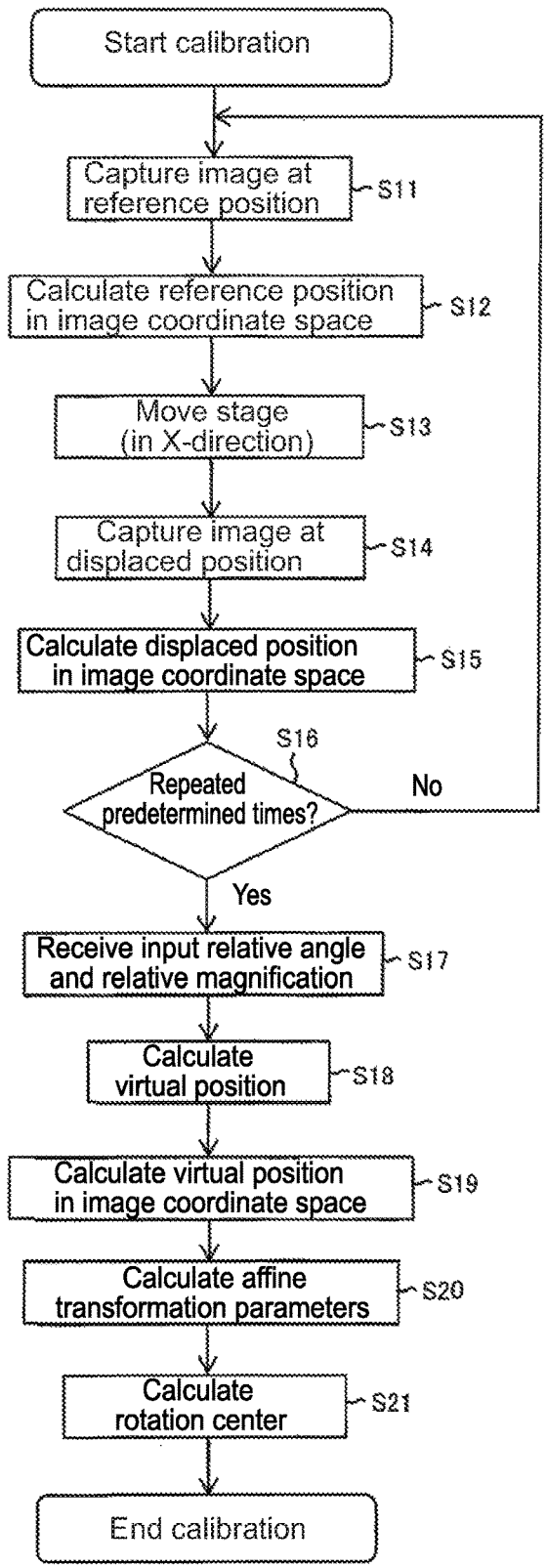
FIG. 7 is a flowchart showing the calibration process according to one embodiment of the present invention.

FIG. 7 is a flowchart showing the calibration process according to one embodiment of the present invention. The calibration process is performed before the alignment process. In the calibration process, the Xθ-stages 300 and 500 are preset at the reference position, for example, at the origin. The workpiece 10 is placed on the Xθ-stages 300 and 500 to allow its positioning mark M to be captured with the first and second cameras 102 and 104. The calibration parameters can be calculated by using the coordinates for three points indicating the mark M in the images (the camera coordinate system) captured with the first and second cameras 102 and 104 after the X-stage 300 and the Y-stage 400 are moved. Although the coordinates for the two points indicating the marks M in the images captured with the cameras 102 and 104 for the stages shown in FIG. 1 can be obtained after the X-stage 300 is moved, the cameras 102 and 104 cannot obtain the coordinates for another point indicating the mark M in the images after the movement of the Y-stage 400. As the third point indicating the mark M obtained after the movement (virtual position) of the Y-stage 400 in the images captured with the cameras 102 and 104, the virtual position in the image coordinate space is calculated based on characteristic values of the Y-stage. This yields the calibration parameters.

As shown in FIG. 7, the image processing apparatus 100 captures an image of the mark M on the workpiece 10 (step S11), and calculates the position of the positioning mark M in the image as a reference position in the image coordinate space (step S12).

In step S13, the workpiece 10 is moved by a predetermined distance in X-direction along the X-stage 300 by the motion controller 200. The predetermined distance is set to allow the mark M to stay within the image. The image processing apparatus 100 captures an image of the mark M again at the set position (step S14) and calculates the position of the mark M in the image again as a displaced position in the image coordinate space (step S15). After this sampling process, the processing advances to step S16.

In step S16, the image processing apparatus 100 determines whether the sampling process from steps S11 to S15 has been repeated a predetermined number of times. When the sampling process from steps S11 to S15 has been repeated the predetermined number of times, the image processing apparatus 100 advances the processing to step S17. When the determination is negative, the image processing apparatus 100 moves the Xθ-stages 300 and 500 back to the reference position, and returns the processing to step S11. The sampling process is repeated to average the noise produced in each sampling process, and increases the estimation accuracy for the X-axis. In the sampling process, the θ-stage 500 may be rotated to displace the positioning mark M in the vertical direction (in Y-direction) in the image and move the positioning mark M to the upper left, upper right, lower left, and lower right in the image in this order.

Figure 8A:
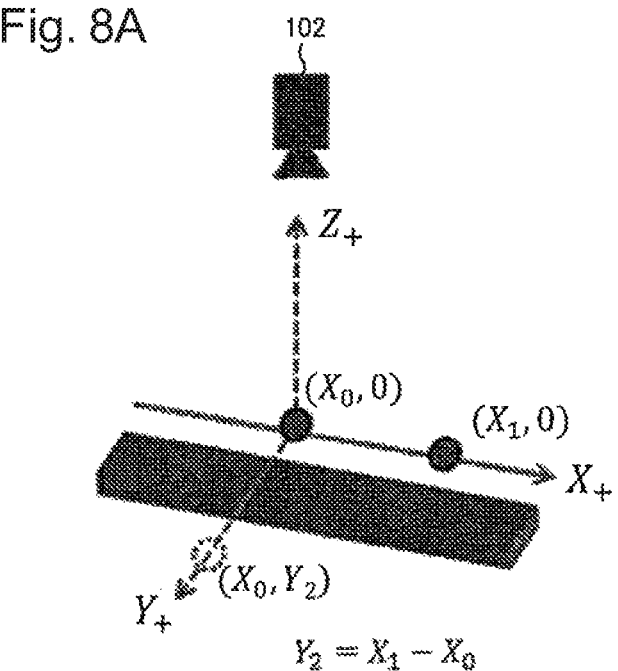
FIGS. 8A and 8B are diagrams showing right-handed and left-handed stage coordinate systems.
Figure 8B:
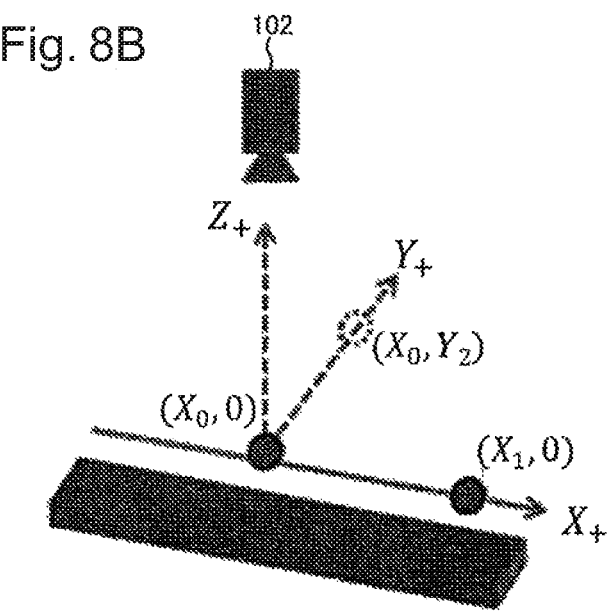

In step S17, the image processing apparatus 100 receives input of a relative angle α and a relative magnification β through a user interface (UI) shown in FIG. 11A or 11B. The relative angle α is an angle to be formed by the positive direction of an axis (X-axis) of the X-stage 300 and the positive direction of an axis (virtual Y-axis) of the Y-stage 400, which is installed independently of the Xθ-stages 300 and 500. The relative angle α may be defined in a left-handed coordinate system shown in FIG. 8A or in a right-handed coordinate system shown in FIG. 8B. The coordinate system setting may also be received through the UI. FIG. 11A shows a UI used for a stage without including the θ-stage 500 shown in FIG. 12. FIG. 11B shows a UI used for a stage including the θ-stage 500 shown in FIG. 1.

The relative magnification β is the magnification of the Y-axis (virtual Y-axis) relative to the X-stage 300 (X-axis) in the stage coordinate system. The relative magnification is the ratio of a displacement of the Y-stage 400 in response to an instruction output from the motion controller 200 to a displacement of the X-stage 300 in response to an instruction output from the motion controller 200. The UI in FIG. 11A or FIG. 11B shows an input relative magnification of 1.000000, indicating that the X-stage 300 and the Y-stage 400 move by the same distance in response to an instruction for moving by a predetermined distance provided from the motion controller 200. Although typical stages are designed with a relative angle α of 90 degrees and a relative magnification β of 1, such values for the stages can be input by the user to correct errors that may occur in the Xθ-stages 300 and 500 and the Y-stage 400 during manufacture. The stages may also be used for special purpose with a relative angle α other than 90 degrees and a relative magnification other than 1. These characteristic values for the stages may be input when the calibration process is started. The input values are stored into the memory 111.

In step S18, the image processing apparatus 100 calculates a virtual position in the stage coordinate system. More specifically, the stage coordinate system is expressed using the coordinates $(X_n, Y_n)$ written with uppercase letters. A virtual position $(X_0, Y_2)$ (first virtual point) is calculated using the reference position $(X_0, 0)$ (first reference position) at which an image is captured in step S11, a position $(X_1, 0)$ (first displaced position) to which the X-stage 300 is moved from the reference position in X-direction in step S13, and the relative magnification β and the setting of either the left-handed or right-handed coordinate system received in step S17 (refer to FIG. 8). When the relative angle α is 90 degrees and the relative magnification β is 1, $Y_2$ is $(X_1-X_0)$. This coordinate transformation is expressed by the general formula $Y_2 = \sin\alpha \times \beta(X_1 - X_0)$.

Figure 9A:
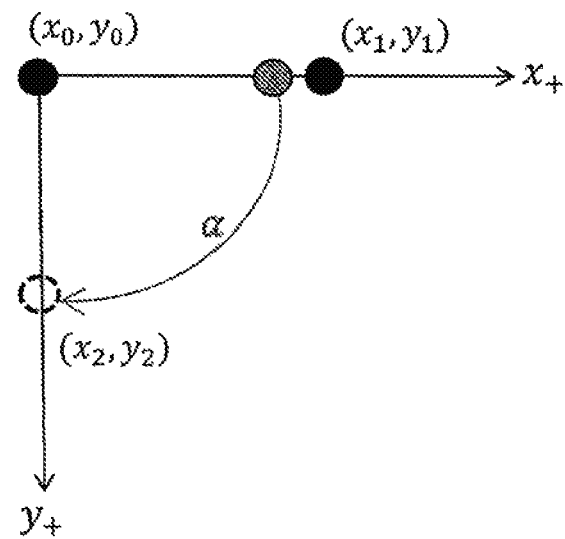
FIGS. 9A and 9B are diagrams showing right-handed and left-handed camera coordinate systems.
Figure 9B:
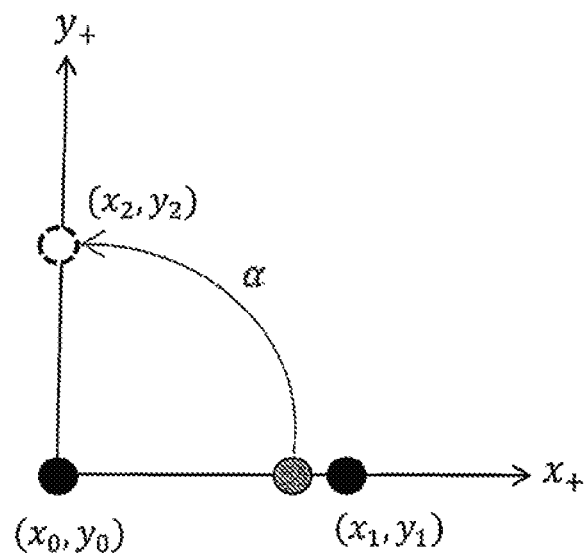

In step S19, the image processing apparatus 100 calculates a virtual position in the image coordinate space in the camera coordinate system corresponding to the virtual position in the stage coordinate system. More specifically, the camera coordinate system is expressed using the coordinates $(x_n, y_n)$ written with lowercase letters. When the reference position $(x_0, y_0)$ (reference position in the first image coordinate space) for the positioning mark M in the image captured at the reference position $(X_0, 0)$ in the image coordinate space and a position $(x_1, y_1)$ (displaced position in the first image coordinate space) of the positioning mark M in the image captured at the position $(X_1, 0)$ to which the X-stage 300 is moved from the reference position $(X_0, 0)$ in X-direction are calculated, and the left-handed coordinate system is set in step S17, the image processing apparatus 100 calculates a virtual position $(x_2, y_2)$ (virtual position in the first image coordinate space) in the image coordinate space in the camera coordinate system using formula 1 in FIG. 10 (refer to FIGS. 8A and 9A). Using formula 1 shown in FIG. 10, the image processing apparatus 100 calculates the corresponding virtual position in the camera coordinate system using the same relative angle α formed by the X-axis and the Y-axis and the same relative magnification β received in step S17 used in the stage coordinate system. The image processing apparatus 100 multiplies the displacement of the mark M from the reference position in the image coordinate space in the camera coordinate system by the relative magnification β and rotates the resultant position clockwise by the relative angle α to yield the resultant coordinates as the virtual position. When the right-handed coordinate system is set in step S17, the virtual position $(x_2, y_2)$ in the image coordinate space in the camera coordinate system is calculated using formula 2 in FIG. 10 (refer to FIGS. 8B and 9B). Using formula 2 shown in FIG. 10, the image processing apparatus 100 multiplies the displacement of the mark M from the reference position in the image coordinate space in the camera coordinate system by the relative magnification β, and rotates the resultant position counterclockwise by the relative angle α to yield the resultant coordinates as the virtual position.

In step S20, the image processing apparatus 100 calculates affine transformation parameters as the calibration parameters described above. More specifically, the image processing apparatus 100 calculates affine transformation parameters (A, B, C, D, E, and F) with formula 3 in FIG. 10 using the reference position $(x_0, y_0)$ in the image coordinate space and its corresponding position $(X_0, 0)$ in the stage coordinate system, with formula 4 using the position $(x_1, y_1)$ in the camera coordinate system and its corresponding reference position $(X_1, 0)$ in the stage coordinate system, and with formula 5 in FIG. 10 using the virtual position $(x_2, y_2)$ in the image coordinate space calculated in step S19 and its corresponding virtual position $(X_0, Y_2)$ in the stage coordinate space. As described above, the coordinate $Y_2$ of the virtual position $(X_0, Y_2)$ in the stage coordinate system is obtained with formula 6 shown in FIG. 10.

Figure 4:
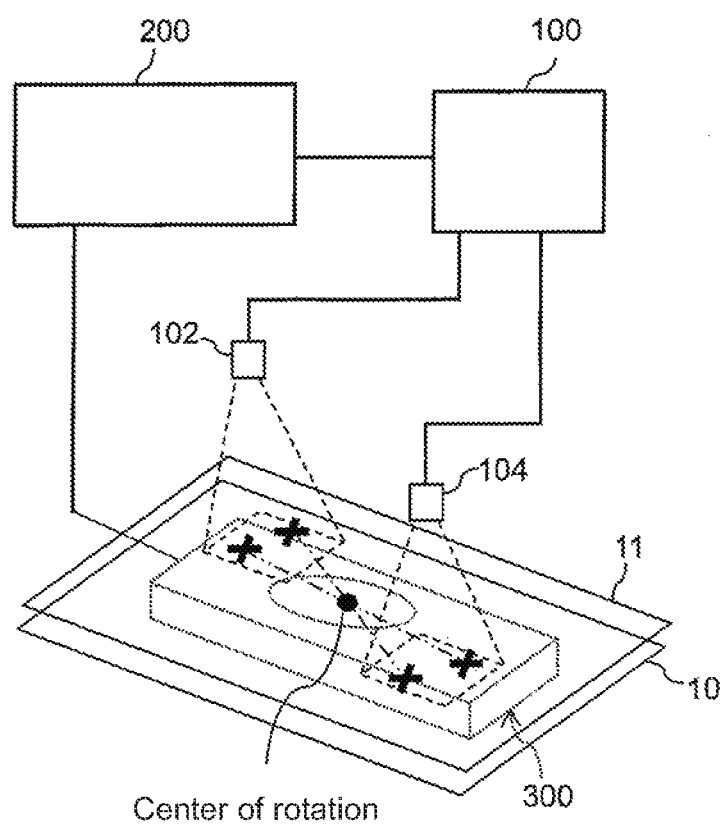
FIG. 4 is a diagram describing a method for determining target coordinates.

In step S21, the rotational axis of the θ-stage 500 is determined in the camera coordinate system. A method for determining the rotational axis of the θ-stage 500 in the camera coordinate system will now be described in detail with reference to FIGS. 4 and 5A to 5C. FIGS. 4 and 5A to 5C are diagrams describing the method for determining the rotational axis of the θ-stage 500. As shown in FIG. 4, the image processing apparatus 100 captures images of the positioning marks M on the workpiece 10 with the corresponding cameras 102 and 104, and calculates the rotation center and the rotational angle of the workpiece 10 to determine the rotational axis of the θ-stage 500.

Figure 5A:
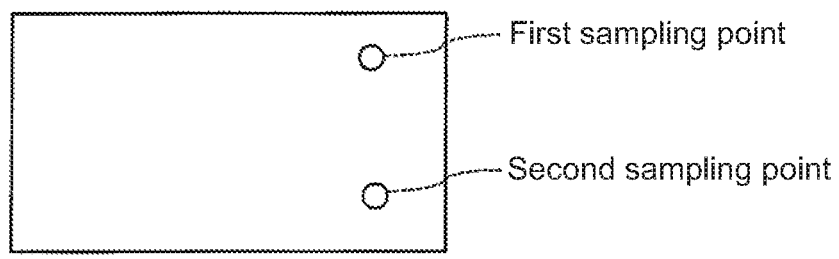
FIGS. 5A to 5C are diagrams describing the method for determining target coordinates.
Figure 5B:
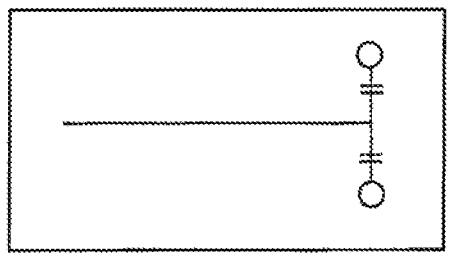
Figure 5C:
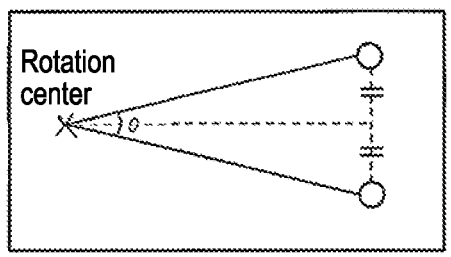

As shown in FIGS. 5A to 5C, the θ-stage 500 is rotated by an angle θ to allow the positioning marks M to stay within the fields of view of the cameras 102 and 104. The resultant positional displacement of each positioning mark M from the position of each mark before the rotation is used to estimate the rotation center. More specifically, as shown in FIG. 5A, the workpiece 10 with the positioning mark M is rotated by the angle θ with the θ-stage 500. The position of the positioning mark M before the rotation is referred to as a first sampling point (reference position in the third image coordinate space) and the position of the positioning mark M after the rotation is referred to as a second sampling point (displaced position in the third image coordinate space).

As shown in FIG. 5B, a straight line is defined to connect the coordinate points indicating the positions of the positioning mark M before and after the rotation by the angle θ. As shown in FIG. 5C, the coordinates indicating the position forming the angle θ with these two points indicating the positioning mark M on the perpendicular bisector of the straight line are calculated. The calculated coordinates are determined as the rotation center of the Xθ-stages 300 and 500.

The rotation center of the θ-stage 500 arranged at the midpoint of the movable range of the X-stage 300 may be used as the origin of the stage coordinate system. Through the sampling shown in FIGS. 5A to 5C using the rotation center of the θ-stage 500 set as the origin, the coordinates of the sampled mark M in the stage coordinate system can be calculated. This allows matching of the camera coordinate system with the stage coordinate system.

Figure 12:
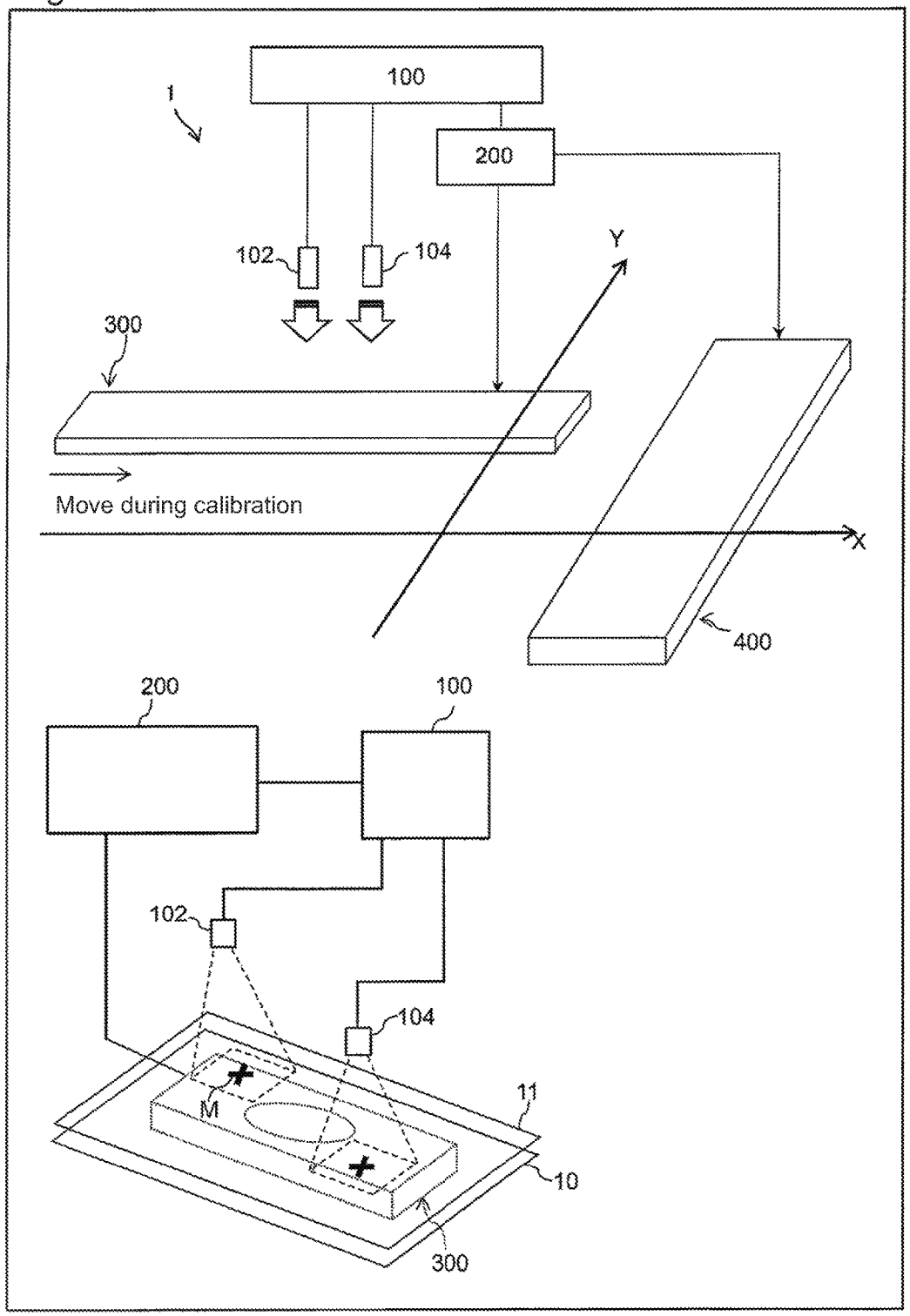
FIG. 12 is a diagram showing a positioning system according to a modification of the embodiment.

Although the image processing apparatus 100 according to the present embodiment performs calibrations using the positioning system 1 including the Xθ-stages 300 and 500 as described above, the image processing apparatus 100 may use a positioning system with the structure based on the disclosure herein without including the θ-stage 500 shown in FIG. 12. This positioning system is used when, for example, no rotational deviation can be caused by a jig used to mount a workpiece 11 onto the stage 300, or when a circular workpiece 11 involving no rotational alignment is to be processed.

In the above embodiment, the coordinates of the virtual position used in the calibration are calculated using the formulas $Y_2 = \sin \alpha \times \beta (X_1 - X_0)$ for the Y-coordinate in the stage coordinate system, and $y_2 = \sin \alpha \times \beta (X_1 - X_0) + \cos \alpha \times \beta (y_1 - y_0) + y_0$ for the y-coordinate in the camera coordinate system.

In some embodiments, the coordinate $Y_2$ in the stage coordinate system may be calculated from a value $X_3$ on the X-axis in the stage coordinate system in place of the X-coordinate value $X_1$. The coordinate $Y_2$ is a Y-coordinate value calculated from the value $X_3$ using the relative angle α and the relative magnification β in the same manner as described above. The coordinate $y_2$ in the camera coordinate system may also be calculated from the value $x_3$ on the x-axis in the camera coordinate system corresponding to the value $X_3$ in the stage coordinate system. The coordinate $y_2$ is a y-coordinate value calculated from the value $x_3$ using the relative angle α and the relative magnification β in the same manner as described above.

Although the image processing apparatus 100 calibrates the Xθ-stages 300 and 500 for the cameras 102 and 104 using the Y-stage as a virtual axis, the image processing apparatus 100 may calibrate the Y-stage for the cameras 105 and 106 shown in FIG. 1 using the X-stage as a virtual axis. The virtual axis can be switched between the stages using the UI described above.

More specifically, the switching is performed from the X-stage 300 to the Y-stage 400, and to the cameras 105 and 106, which can capture an image of the Y-stage 400 or an image of an object placed on the Y-stage 400. The reference position in the image coordinate space (reference position in the second image coordinate space), indicating the position of the mark in the image when the Y-stage 400 is at the reference position (second reference position), is obtained. The position of the mark in the image (displaced position in the second image coordinate space) when the Y-stage 400 is at a position to which the Y-stage 400 is moved from the second reference position in Y-direction (second displaced position) is obtained. The position of the mark in the image (virtual position in the second image coordinate space) when the Y-stage 400 is assumed to be at a virtual position (second virtual position) to which the Y-stage 400 is virtually moved from a predetermined position by a predetermined distance in X-direction is obtained using the characteristic values of the X-stage. The calibration is then performed using the second reference position, the second displaced position, the second virtual position, the reference position in the second image coordinate space, the displaced position in the second image coordinate space, and the virtual position in the second image space.

Implementations Using Software

Each functional block of the image processing apparatus 100 (in particular the processing unit 101) may be achieved using a logic circuit (hardware) such as an integrated circuit (IC chip), or using software implemented by a central processing unit (CPU).

When the functional blocks are achieved by using software, the image processing apparatus 100 includes a CPU, which executes instructions included in a program or software to achieve the functions, a read-only memory (ROM) or a storage device (hereinafter referred to as a storage medium), which stores the program and various data readable by a computer (or by the CPU), and a random access memory (RAM), into which the program is expanded. The computer (or CPU) reads the program from the storage medium, and executes the program to achieve one or more aspects of the present invention. The storage medium may be a non-transitory tangible medium, such as a tape, a disk, a card, a semiconductor memory, or a programmable logic circuit. The program may be provided via any transmission medium that can transmit the program to the computer (such as a communication network or a broadcast wave). One or more embodiments of the present invention may be implemented using programs that are electronically transmitted in the form of data signals carried by carrier waves.

The embodiments disclosed herein should not be construed to be restrictive, but may be modified within the spirit and scope of the claimed invention. The technical features disclosed in different embodiments may be combined in other embodiments within the technical scope of the invention. The technical features disclosed in the embodiments may further be combined to provide novel technical features.

REFERENCE SIGNS LIST 1 positioning system (industrial device)
10 workpiece
100 image processing apparatus
102, 104 camera (imaging device)
113 operational unit (UI)
114 display (UI)
200 motion controller
300 X-stage (first stage)
400 Y-stage (second stage)
500 θ-stage (third stage)

α relative angle
β relative magnification

The invention claimed is:

1. An image processing apparatus for performing a positional calibration between a stage coordinate system for a stage structure and a camera coordinate system for a first camera, the stage structure comprising a first stage movable in a first direction and a second stage movable in a second direction independently of the first stage, the first camera capturing an image of a first mark on the first stage or an image of the first mark on an object placed on the first stage, the image processing apparatus comprising:
 a memory storing a characteristic value of the stage structure, the characteristic value comprising a mechanical relationship between the first stage and the second stage, and a positional calibration parameter; and
 a processor configured with a program to perform operations comprising calculating the positional calibration parameter using positions of the first mark in a plurality of images captured by the first camera and the characteristic value,
 wherein the processor is configured with the program to perform operations further comprising:
  obtaining a reference position in a first image coordinate space indicating a position of the first mark in a first image captured by the first camera when the first stage is at a first reference position,
  obtaining a displaced position in the first image coordinate space indicating a position of the first mark in a second image captured by the first camera when the first stage is at a first displaced position to which the first stage moves in the first direction from the first reference position,
  calculating a first virtual position in the stage coordinate system indicating a position to which the first mark is assumed to move to in response to the first stage moving in the first direction from the first reference position to the first displaced position, the first virtual position calculated by multiplying the characteristic value with a displacement in the stage coordinate system of the first stage from the reference position at the first displaced position,
  calculating a virtual position in the first image coordinate space corresponding to the first virtual position in the stage coordinate system by multiplying the characteristic value with a displacement in the first image coordinate space of the first mark at the displaced position in the first image coordinate space from the reference position in the first image coordinate space,
  calculating a first positional calibration parameter to transform the camera coordinate system into the stage coordinate system by comparing the first reference position with the reference position in the first image coordinate space, the first displaced position with the displaced position in the first image coordinate space, and the first virtual position with the virtual position in the first image coordinate space, and
  storing the first positional calibration parameter in the memory.

2. The image processing apparatus according to claim 1, wherein
 the characteristic value comprises at least one of a relative angle of the second direction relative to the first direction or a relative magnification of a displacement of the second stage relative to the first stage.

3. The image processing apparatus according to claim 2, wherein
 the processor is configured with the program to perform operations further comprising:
 calculating a corrected position in an image coordinate space indicating a position to which the reference position in the first image coordinate space moves in a direction of the displaced position in the first image coordinate space by a distance between the displaced position in the first image coordinate space and the reference position in the first image coordinate space multiplied by the relative magnification, and
 calculating the virtual position in the first image coordinate space indicating a position to which the corrected position in the image coordinate space rotates by the relative angle about the reference position in the first image coordinate space.

4. The image processing apparatus according to claim 1, wherein the processor is configured with the program to perform operations further comprising:
 operation as an input unit configured to receive input information,
 receiving the characteristic value from a user.

5. The image processing apparatus according to claim 1, further comprising:
 a second camera configured to capture an image of a second mark on the second stage or an image of the second mark on an object placed on the second stage,
 wherein the processor is configured with the program to perform operations further comprising:
 obtaining a reference position in a second image coordinate space indicating a position of the second mark in a third image captured by the second camera when the second stage is at a second reference position,
 obtaining a displaced position in the second image coordinate space indicating a position of the second mark in a fourth image captured by the second camera when the second stage is at a second displaced position to which the second stage moves in the second direction from the second reference position,
 calculating a virtual position in the second image coordinate space indicating a position of the second mark in an image calculated using the characteristic value of the first stage in the memory when the second mark is assumed to move to a second virtual position,
 calculating a second positional calibration parameter using the second reference position, the second displaced position, the second virtual position, the reference position in the second image coordinate space, the displaced position in the second image coordinate space, and the virtual position in the second image coordinate space, and
 storing the second positional calibration parameter in the memory.

6. The image processing apparatus according to claim 5, wherein
 the processor is configured with the program to perform operations further comprising:
 operation as an output unit configured to output a value,
 calculating a position of the first mark in the stage coordinate system using the position of the first mark in the first image captured by the first camera and the first positional calibration parameter,
 calculating a position of the second mark in the stage coordinate system using the position of the second mark in the third image captured by the second camera and the second positional calibration parameter, and calculating a difference between the position of the first mark and the position of the second mark in the stage coordinate system, and outputting by the output unit the calculated difference.

7. The image processing apparatus according to claim 5, wherein the processor is configured with the program to perform operations further comprising:

operation as an output unit configured to output a value, calculating a position of the first mark in the stage coordinate system using the position of the first mark in the first image captured by the first camera and the first positional calibration parameter, and calculating a position of the second mark in the stage coordinate system using the position of the second mark in the third image captured by the second camera and the second positional calibration parameter, and outputting by the output unit the calculated position of the first mark and the calculated position of the second mark.

8. The image processing apparatus according to claim 1, further comprising:

a third stage movable in conjunction with the first stage and rotatable, wherein the processor is configured with the program to perform operations further comprising:

obtaining a reference position in a third image coordinate space indicating a position of a mark on the first stage, the mark on an object placed on the first stage, the mark on the third stage, or the mark on the object placed on the third stage in a third image captured by the first camera when the third stage is at a third reference position, obtaining a displaced position in the third image coordinate space indicating a position of the mark in a fourth image captured when the third stage rotates from the third reference position by a predetermined angle, calculating a position of a rotation center of the third stage using the reference position in the third image coordinate space, the displaced position in the third image coordinate space, and the predetermined angle, and storing the position of the rotation center in the memory.

9. The image processing apparatus according to claim 8, wherein the processor is configured with the program to perform operations further comprising:

operation as an output unit configured to output a value, calculating a rotational angle of the third stage to move the mark from the position of the mark in the plurality of images captured by the first camera to a predetermined target position, and operation as the output unit configured to output the rotational angle.

10. A position calibration method implemented by an image processing apparatus comprising a processor configured to perform operations comprising operations to perform a positional calibration between a stage coordinate system for a stage structure and a camera coordinate system for a first camera, the stage structure comprising a first stage movable in a first direction and a second stage movable in a second direction independently of the first stage, the first camera capturing an image of a first mark on the first stage or an image of the first mark on an object placed on the first stage, the method implemented by the processor comprising:

obtaining a reference position in a first image coordinate space indicating a position of the first mark in a first image captured by the first camera when the first stage is at a first reference position, obtaining a displaced position in the first image coordinate space indicating a position of the first mark in a second image captured by the first camera when the first stage is at a first displaced position to which the first stage moves in the first direction from the first reference position, calculating a first virtual position in the stage coordinate system indicating a position to which the first mark is assumed to move to in response to the first stage moving in the first direction from the first reference position to the first displaced position, the first virtual position calculated by multiplying a characteristic value with a displacement in the stage coordinate system of the first stage at the first displaced position from the reference position, wherein the characteristic value comprises a mechanical relationship between the first stage and the second stage, calculating a virtual position in the first image coordinate space corresponding to the first virtual position by multiplying the characteristic value with a displacement in the first image coordinate space of the first mark at the displaced position in the first image coordinate space from the reference position in the first image coordinate space, and calculating a first positional calibration parameter to transform the camera coordinate system into the stage coordinate system by comparing the first reference position with the reference position in the first image coordinate space, the first displaced position with the displaced position in the first image coordinate space, and the first virtual position with the virtual position in the first image coordinate space.

11. The position calibration method according to claim 10, further comprising:

switching to a second positional calibration with a second camera configured to capture an image of a second mark on the second stage or an image of the second mark on an object placed on the second stage;

obtaining a reference position in a second image coordinate space indicating a position of the second mark in a third image captured when the second stage is at a second reference position;

obtaining a displaced position in the second image coordinate space indicating a position of the second mark in a fourth image captured when the second stage is at a second displaced position to which the second stage moves in the second direction from the second reference position;

calculating a virtual position in the second image coordinate space indicating a position of the second mark in an image calculated using the characteristic value of the first stage when the second mark is assumed to move to a second virtual position; and calculating a second positional calibration parameter using the second reference position, the second displaced position, the second virtual position, the reference position in the second image coordinate space, the displaced position in the second image coordinate space, and the virtual position in the second image coordinate space.

12. The position calibration method according to claim 10, further comprising:

switching to a third positional calibration between a stage coordinate system for a stage structure comprising a third stage movable in conjunction with the first stage and rotatable and the camera coordinate system for the first camera;

capturing a third image of a mark on the first stage, an image of the mark on an object placed on the first stage, an image of the mark on the third stage, or an image of the mark on the object placed on the third stage using the first camera when the third stage is at a third reference position, and obtaining a reference position in a third image coordinate space indicating the position of the mark in the third image;

obtaining a displaced position in the third image coordinate space indicating the position of the mark in a fourth image captured when the third stage rotates from the third reference position by a predetermined angle; and performing a third positional calibration of calculating a rotation center of the third stage using the reference position in the third image coordinate space, the displaced position in the third image coordinate space, and the predetermined angle.

13. A non-transitory computer readable medium storing a program, that when read and executed, causes the processor to implement the method according to claim 10.

14. An industrial device comprising:
a first stage movable in a first direction;
a second stage movable in a second direction independently of the first stage;
a first camera capturing an image of a mark on the first stage or an image of the mark on an object placed on the first stage; and
an image processing apparatus comprising a processor configured with a program to perform operations to process the image,
wherein the processor is configured with the program to perform operations further comprising:
operation as a motion controller configured to control an operation of the first stage and an operation of the second stage;
performing a positional calibration between a stage coordinate system for the first stage and the second stage and a camera coordinate system for the first camera using a reference position in a first image coordinate space indicating a position of the mark in a first image captured when the first stage is at a first reference position, a displaced position in the first image coordinate space indicating the position of the mark in a second image captured when the first stage is at a first displaced position to which the first stage moves in the first direction from the first reference position, a first virtual position in the stage coordinate system indicating a position to which the mark is assumed to move to in response to the first stage moving in the first direction from the first reference position to the first displaced position calculated by multiplying a characteristic value indicating a mechanical relationship of the first stage and second stage with a displacement in the stage coordinate system of the first stage at the first displaced position from the reference position, and a virtual position in the first image coordinate space corresponding to the first virtual position calculated by multiplying the characteristic value with a displacement in the first image coordinate space of the mark at the displaced position in the first image coordinate space from the reference position in the first image coordinate space, and
outputting coordinates in the stage coordinate system resulting from the positional calibration to the motion controller.

* * * * *